United States Patent [19]

Ikeda et al.

[11] Patent Number: 5,375,473
[45] Date of Patent: Dec. 27, 1994

[54] SEMICONDUCTOR TYPE DIFFERENTIAL PRESSURE MEASUREMENT APPARATUS AND METHOD FOR MANUFACTURING THE SAME

[75] Inventors: Kyoichi Ikeda; Tetsuya Watanabe; Hideo Tsukamoto; Takahiro Kudo; Kouji Nagai; Satoshi Fukuhara, all of Tokyo, Japan

[73] Assignee: Yokogawa Electric Corporation, Tokyo, Japan

[21] Appl. No.: 110,582

[22] Filed: Aug. 24, 1993

[51] Int. Cl.[5] .............................................. G01L 9/04
[52] U.S. Cl. ......................................... 73/720; 73/721; 73/706; 338/4
[58] Field of Search .................. 29/621.1; 338/4, 42; 73/720, 721, 726, 727, 706

[56] References Cited

U.S. PATENT DOCUMENTS

| | | | |
|---|---|---|---|
| 4,782,319 | 11/1988 | Dell'Acqua et al. | 338/4 |
| 5,174,158 | 12/1992 | Kremidas | 73/720 X |
| 5,257,546 | 11/1993 | Tobita et al. | 73/721 X |

Primary Examiner—Richard E. Chilcot, Jr.
Assistant Examiner—Joseph L. Felber
Attorney, Agent, or Firm—Moonray Kojima

[57] ABSTRACT

A semiconductor type differential pressure measurement apparatus is disclosed comprising a measuring diaphragm having its periphery fixed, and two measuring chambers, each having a predetermined spacing along both surfaces of the measuring diaphragm, and which detects differential pressure within allowable limits of measurement. When an overpressure is applied, the diaphragm is stopped by a wall of a measuring chamber to prevent the diaphragm from being damaged by overpressure, so that no additional mechanism is required to prevent damage from overpressure. One embodiment utilizes an additional chamber and overhang to reduce overpressure. Another embodiment utilizes a measuring chamber having the two sides of the diaphragm exposed to the ambient to eliminate need for a pressure resistant casing. In a further embodiment, injected impurities serve as a terminal.

7 Claims, 23 Drawing Sheets

Fig.50
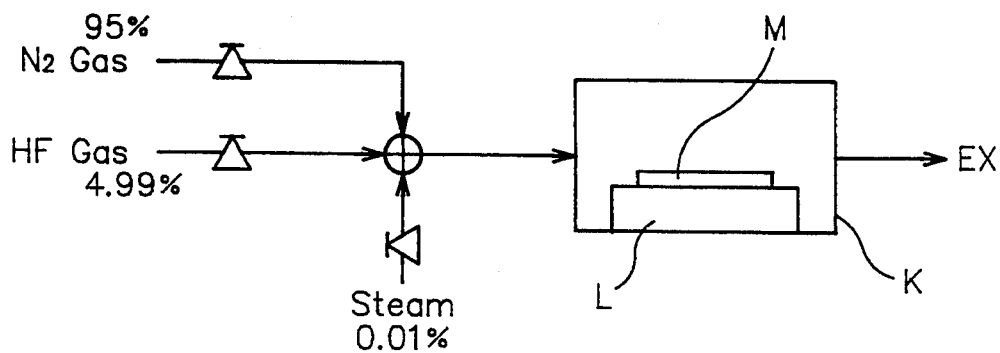
Fig.51
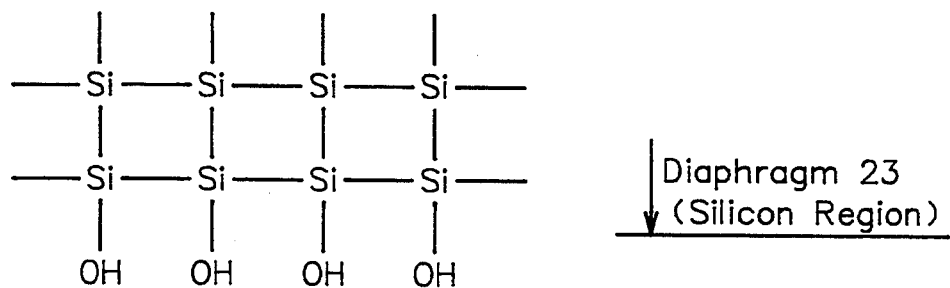
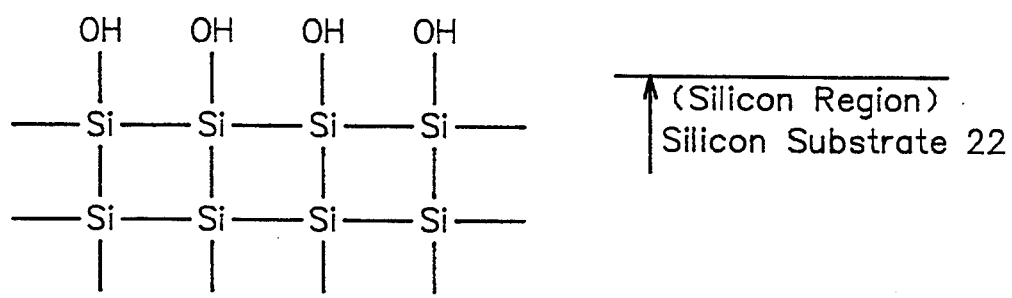

SEMICONDUCTOR TYPE DIFFERENTIAL PRESSURE MEASUREMENT APPARATUS AND METHOD FOR MANUFACTURING THE SAME

BACKGROUND OF THE INVENTION

1. Field of Invention

This invention relates to a compact and inexpensive differential pressure measurement apparatus having a simple structure and which can be manufactured without any special pressure resistant casing or any protective mechanism against overpressure, and which is free of pressure-resistant hermetic terminals.

The invention also relates to a semiconductor type differential pressure measurement apparatus comprising a measuring diaphragm provided on both sides thereof with two measuring chambers each having a predetermined spacing such that it may be immediately stopped by the wall of the measuring chamber when an overpressure is applied to the measuring diaphragm; and which directly utilizes the strain detector for measuring the pressure difference as the detector element for overpressure; and therefore the invention is a simple and inexpensive semiconductor type differential pressure measurement apparatus which is highly reliable for detecting overpressure.

The invention further relates to a semiconductor type differential pressure measurement apparatus manufacturing method which is inexpensive and can manufacture diaphragms with highly precise thicknesses.

The invention also relates to a method for manufacturing a semiconductor type differential pressure measurement apparatus by utilizing a sacrificial layer etching method to eliminate the possibility of the diaphragm adhering to the substrate.

2. Description of the Prior Art

FIG. 1 is an explanatory drawing of a prior art structure, such as shown, for example, in JP-A-59-56137, a published unexamined Japanese application.

Referring to FIG. 1, a flange 2 and another flange 3 are fitted and assembled on both sides of a housing 1 by means of welding or the like, and an inlet 5 for introducing a high pressure fluid with a pressure of $P_H$ and an inlet 4 for introducing a low pressure fluid with a pressure of $P_L$ are provided on both flanges 2 and 3. A pressure measuring chamber 6, provided with a center diaphragm 7 and a silicon diaphragm 8, is provided inside housing 1.

Center diaphragm 7 and diaphragm 8 are each separately fixed on the wall of the pressure measuring chamber 6, to divide chamber 6 into two parts. Plates 6A and 6B are provided on the wall of the pressure measuring chamber 6 in such a manner that they face center diaphragm 7. The periphery of center diaphragm 7 is welded to housing 1.

Diaphragm 8 is made entirely from a single crystal substrate. Four strain gauges 80 are formed on one side of a silicon substrate by selective diffusion of an impurity such as boron, and the other side is subjected to machining and etching to form a concave diaphragm. When diaphragm 8 is subjected to a differential pressure $\Delta P$, two of the strain gauges 80 are subjected to tension whereas the remaining two gauges undergo compression. The strain gauges are connected to a Wheatstone bridge to detect the change of differential pressure $\Delta P$ as a change in electric resistance. A lead 81 is attached at one end to the strain gauge 80, and is connected to a hermetic terminal 82 at the other end.

The hermetic terminal 82 is held by a support 9. The end of support 9 facing pressure measuring chamber 6 is fixed and adhered to diaphragm 8 using a low melting point glass or the like.

Pressure introducing chambers 10 and 11 are provided between housing 1 and each of flanges 1 and 2. Liquid separation diaphragms 12 and 13 are further provided inside pressure introducing chambers 10 and 11, and back plates 10A and 11A having shapes similar to liquid separation diaphragms 12 and 13 are formed on the wall of housing 1 in such a manner that they face liquid separation diaphragms 12 and 13.

Liquid separation diaphragms 12 and 13 together with back plates 10A and 11a define a space communicating with pressure measuring chamber 6 via communicating holes 14 and 15. Portions 101 and 102 filled with a sealed liquid such as silicon oil are provided between liquid separation diaphragms 12 and 13 in such a manner that the sealed liquid may reach the upper and lower planes of diaphragm 8 through communicating holes 16 and 17. The sealed liquid is separated into portions 101 and 102 by center diaphragm 7 and silicon diaphragm 8 such that the amounts in both are substantially equal.

The foregoing apparatus allows transmission of a pressure being exerted from the high pressure side, by transmitting the pressure applied to liquid separation diaphragm 13, to silicon diaphragm 8 via sealed liquid portion 102. When a pressure is applied from the low pressure side, on the other hand, the pressure applied to liquid separation diaphragm 12 is transmitted to silicon diaphragm 8 via sealed liquid portion 101.

Accordingly, it can be seen that silicon diaphragm 8 is deformed by the pressure difference between the pressure on the high pressure side and that on the low pressure side. This quantity of deformation, i.e., strain, is electrically detected by strain gauge 80 for measuring the differential pressure.

The foregoing apparatus, however, suffers from the following disadvantages. (1) Because the pressure $P_H$ on one side of the apparatus is applied to the periphery of the sensor, the exterior of the sensor must be covered by a pressure resistant container. (2) A pressure resistant hermetic seal terminal for transmitting the detected electrical signal to the outside is required. (3) A complex manufacturing method is required to produce a sensor, because a silicon wafer must have both faces thereof machined. (4) An overpressure protection mechanism should be provided separately because the sensor alone has no such protective means against overpressure.

SUMMARY OF THE INVENTION

The invention has the object of overcoming the aforementioned and other deficiencies and disadvantages of the prior art.

Another object is to provide, economically, a high performance and compact differential pressure measurement apparatus which is free of any special pressure resistant casing or separate protective mechanism against overpressure, and without using any pressure resistant hermetically sealed terminals.

BRIEF DESCRIPTION OF THE DRAWINGS

FIG. 50 is a diagram depicting an etching apparatus of the invention.

FIG. 51 is a diagram depicting an operation of another illustrative embodiment of the invention.

DESCRIPTION OF THE PREFERRED EMBODIMENTS

Figure 1:
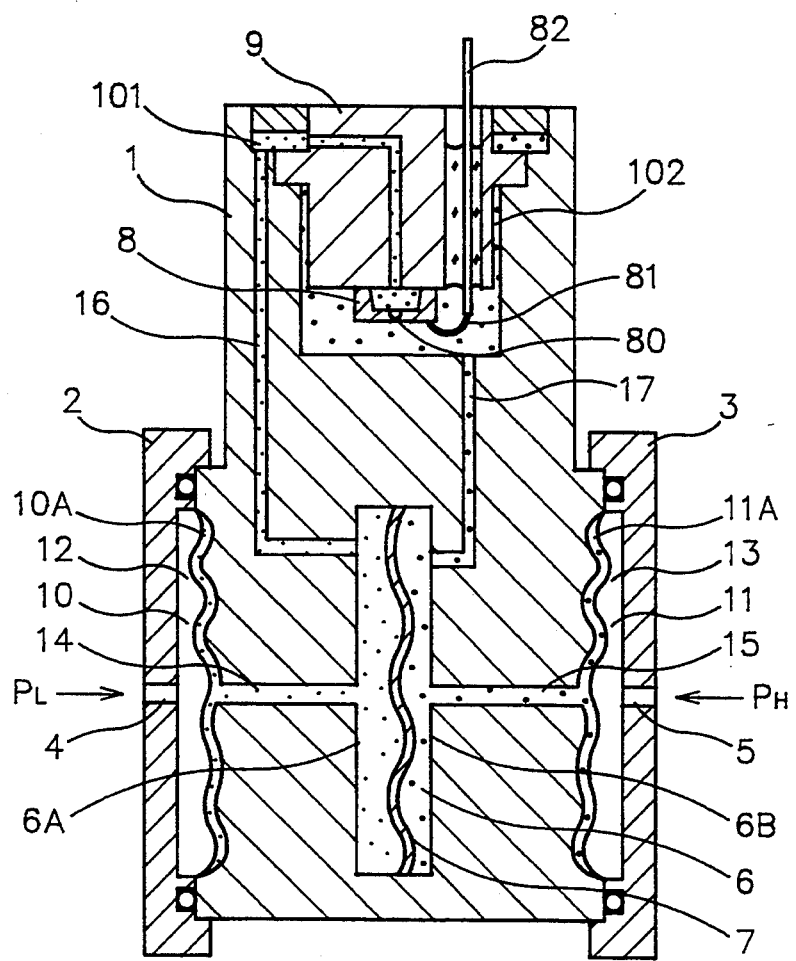
FIG. 1 is a diagram depicting a convention pressure measurement apparatus.
Figure 2:
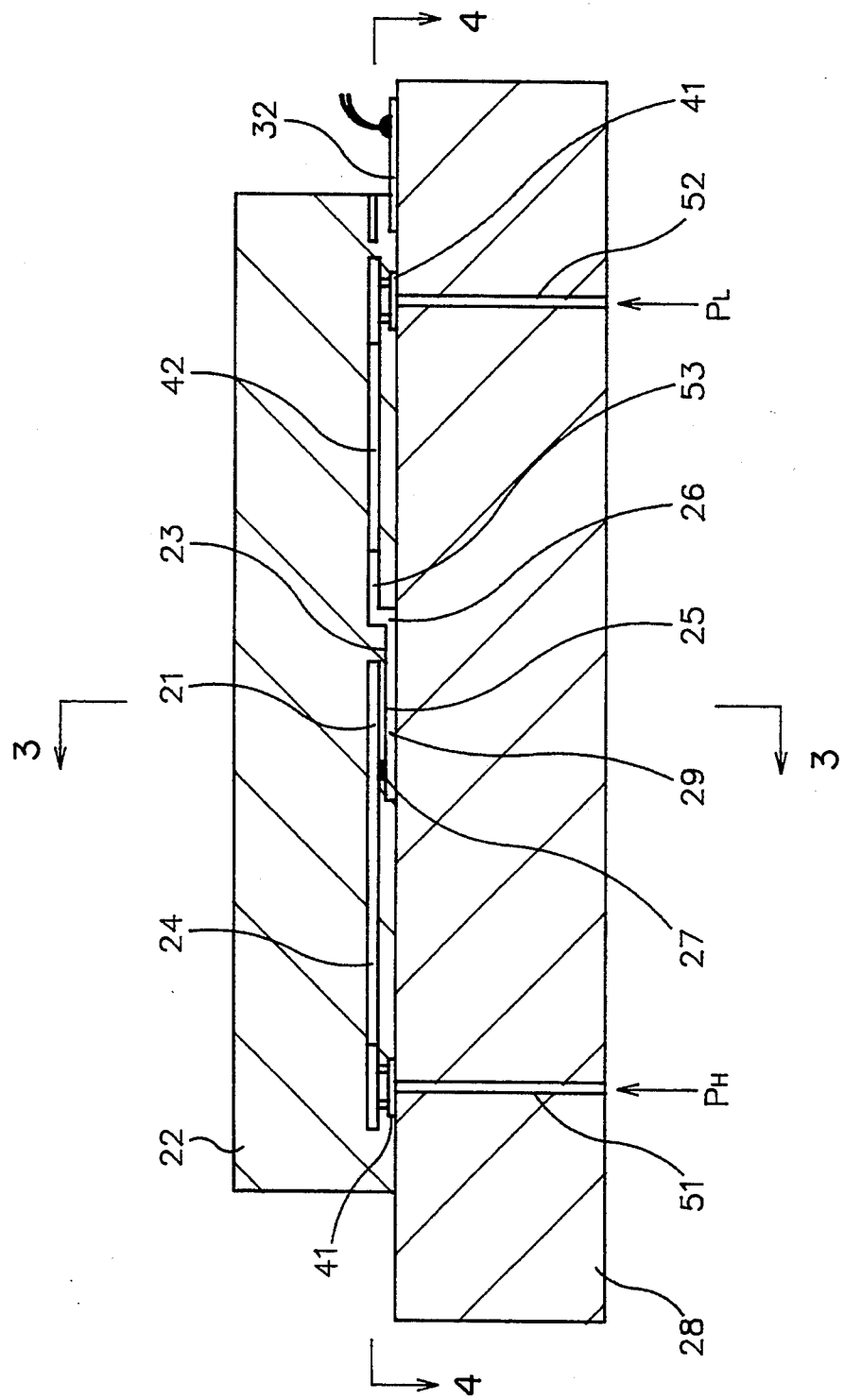
FIG. 2 is a diagram depicting an illustrative embodiment of the invention.
Figure 3:
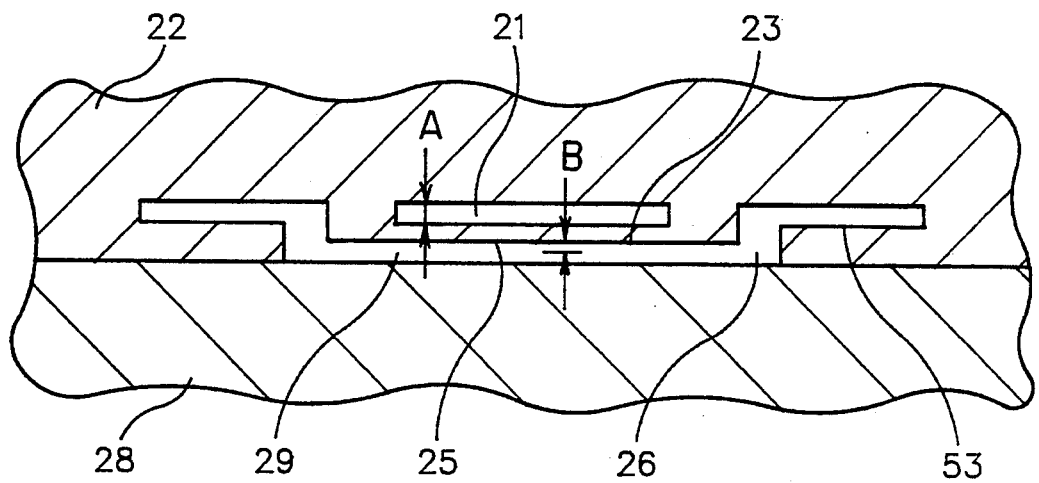
FIG. 3 is a cross sectional view taken along line A—A of FIG. 2
Figure 4:
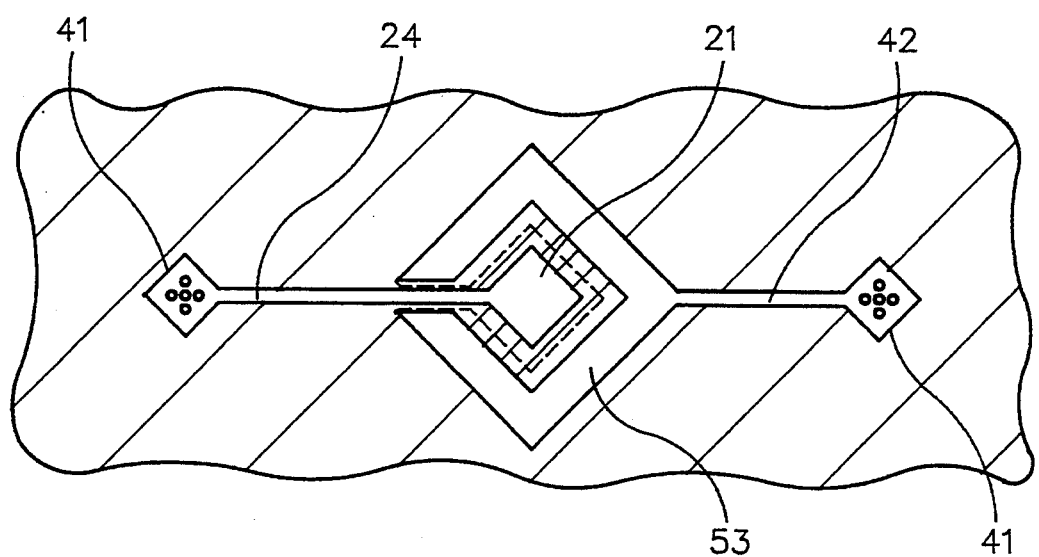
FIG. 4 is a cross sectional view taken along line B—B of FIG. 2.

In FIGS. 2-4, portions having the same functions as those in FIG. 1 are indicated by the same symbols. Only portions which differ from those shown in FIG. 1 are explained hereinafter.

Referring to FIG. 2, a first chamber 21, having an extremely narrow predetermined spacing, is provided on a silicon substrate 22 to form a diaphragm 23.

A first communicating hole 24, which communicates with first chamber 21 at one end thereof, is provided on a silicon substrate 22, and a thin film concave portion 25 is provided in diaphragm 23 on the side opposite to the face on which first chamber 21 is provided. The term "concave" is used to describe the general shape of portion 25 and is not used to limit the shape or dimensions of such portion. The cross-sectional view of FIG. 3 shows more clearly the general step-wise (or as we characterize it "concave") shape of portion 25.

A second chamber 26, communicating with concave portion 25, is provided on silicon substrate 22, and diaphragm 23 is surrounded by second chamber 26 in a ring-like manner except at first communicating hole 24.

A strain detector element 27 is provided on the side of diaphragm 23 facing concave portion 25.

A support substrate 28 is joined at one surface thereof with the surface of silicon substrate 22 on which the concave portion, is provided. Substrate 28, together with concave portion 25, defines a chamber 29 and second chamber 26.

Figure 5:
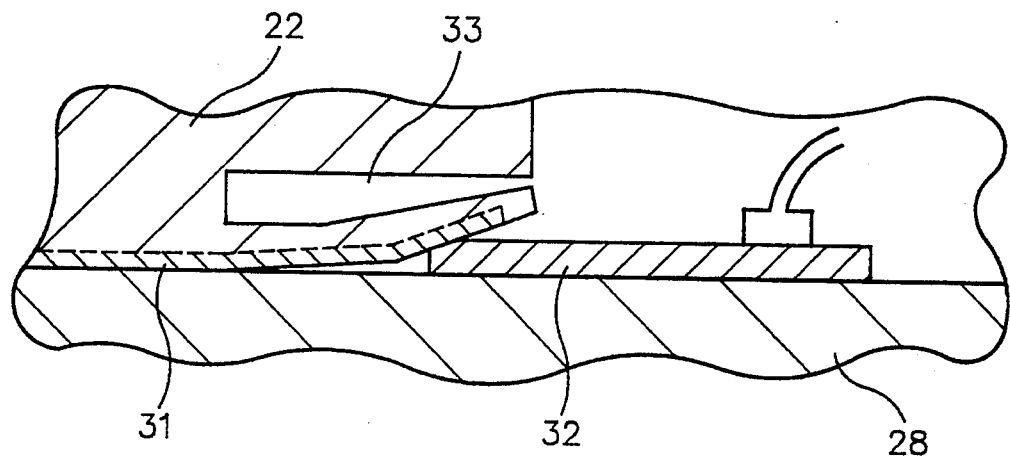
FIG. 5 is a detailed diagram depicting a portion of FIG. 2.

Referring to FIG. 5, a connection 31 is formed by introducing impurities into the area connecting silicon substrate 22 and support substrate 28, and is connected to strain detector element 27 at one end. (see also FIG. 2).

A contact 32 is provided to support substrate 28 on the side which is joined with substrate 22, and is connected to connection 31 at one end, as depicted.

A groove 33 is formed on substrate 22 in the vicinity of contact 32. Groove 33 absorbs any undesired force generated at the contact portion between substrate 22 and contact 32 to assure stable contact between contact 32 and connection 31.

Figure 6:
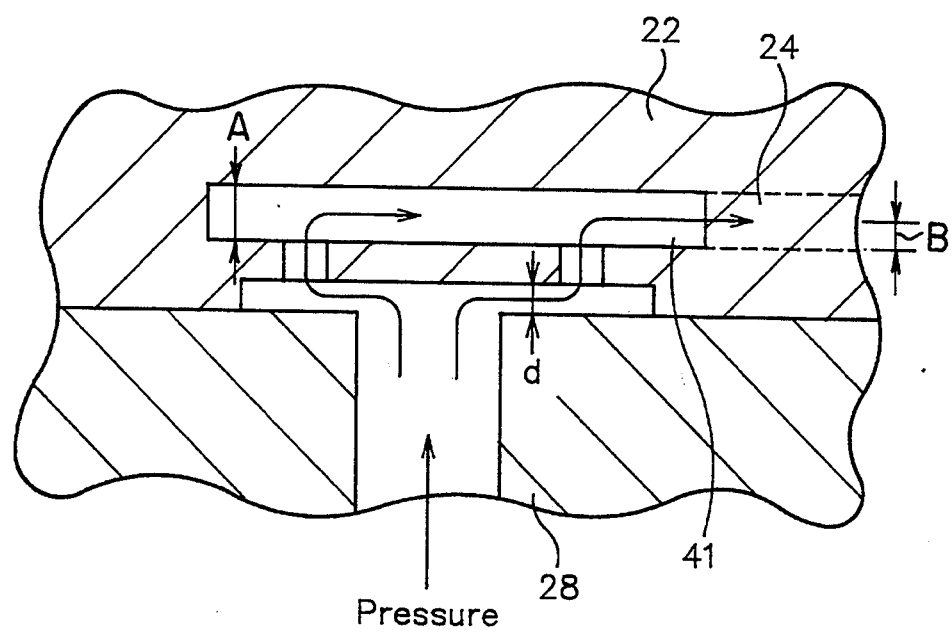
FIG. 6 is a detailed diagram depicting a portion of FIG. 2.

As shown in FIG. 6, a filter portion 41 is provided in substrate 22 to prevent inclusions contained in the fluid, i.e., the pressure medium, from entering first chamber 21 or chamber 29. In this embodiment, two filter portions are provided in the apparatus.

The inclusion of unfavorable dust or particles is avoided by applying a semiconductor fabrication process to provide a sufficiently small gap d for filter portion 41. That is gap d of filter portion 41 is formed in such a manner that it is sufficiently small so as to satisfy the relation $d \leq (A-B)$, wherein A represents the depth (i.e. shown vertically in the drawing) spacing of first chamber 21 (see FIG. 6), and B represents the displacement of diaphragm 23 into second chamber 29 (see FIGS. 2, 3, 4 and 6). One side of filter portion 41 is connected to first communicating hole 24, and the other side is connected to chamber 29 via second communicating hole 42 (see FIGS. 2 and 4).

Returning to FIG. 2, a third communicating hole 51, for introducing pressure, is provided in supporting substrate 28 and is connected to one of the sides of filter portion 41. The other end is left open to the atmosphere.

A fourth connection hole 52, for introducing pressure, is provided in substrate 28 and is connected to one of the sides of filter portion 41. The other end is left open to the atmosphere.

An overhang 53 is connected to second chamber 26. Overhang 53 is provided so that it may receive high pressure in case such high pressure is applied to overhang 53, thereby preventing a large stress from being generated at the joined portion between substrate 22 and substrate 28.

In the above described structure, the measuring pressure of the high pressure side is applied to first chamber 21 whereas the measuring pressure of the low pressure is applied to chamber 29.

As a result, diaphragm 23 is deformed in accordance with the pressure difference between the higher and lower pressure sides, and the strain generated thereby is electrically detected by strain detector element 27. Thus, differential pressure can be measured by such element 27 and outputted as an electrical signal via lead 31 and contact 32.

When an overpressure is applied to first chamber 21, the wall of chamber 29 stops diaphragm 23. On the other hand, when an overpressure is applied to chamber 29, the wall of first chamber 21 stops diaphragm 23.

Figure 7:
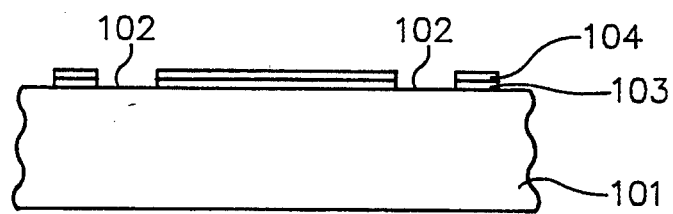
FIG. 7 is a diagram depicting an etching step in the formation of the structure of FIG. 2.
Figure 8:
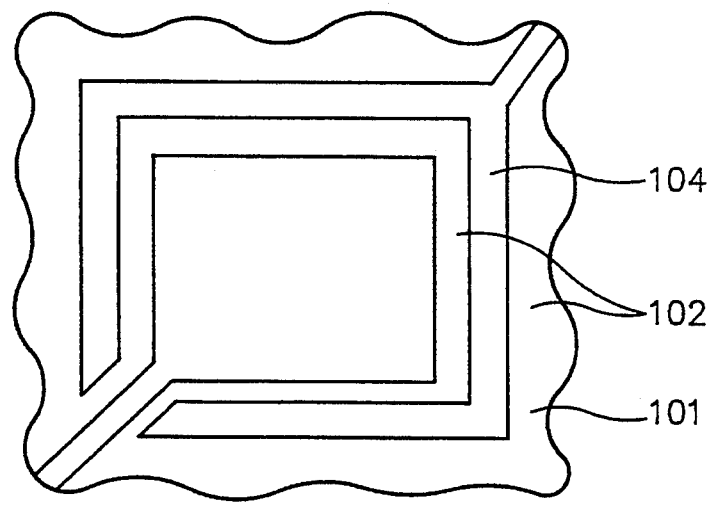
FIG. 8 is a plan view of the structure of FIG. 7.

The process for fabricating the embodiment is described below with reference to the steps thereof illustrated in FIGS. 7–14. Referring to FIG. 7, a desired pattern 102 is etched out on an SOI (silicon on insulator) wafer 101 by RIE (reactive ion enhancement) etching a silicon oxide layer 103 and a silicon layer 104. The plan view of the structure shown in FIG. 7 is shown in FIG. 8.

Figure 9:
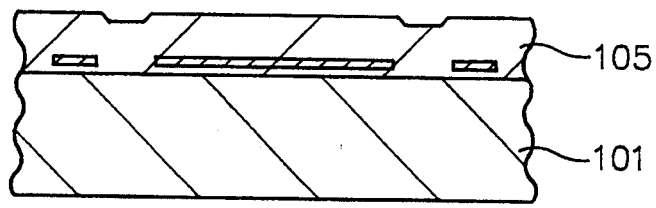
FIGS. 9-14 are diagrams depicting steps in the manufacture of the embodiment of FIG. 2.

An epitaxially grown layer 105 is provided on the surface of the SOI wafter 101, as shown in FIG. 9.

Figure 10:
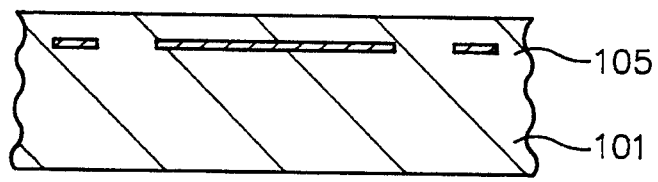

The surface of the epitaxially grown layer 105 is polished, as in FIG. 10, to obtain a mirror surface.

Figure 11:
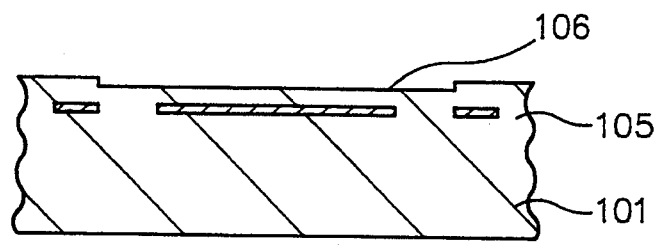

Referring to FIG. 11, the surface of the epitaxially grown layer 105 is etched by an RIE etching method to form a concave portion 106.

Figure 12:
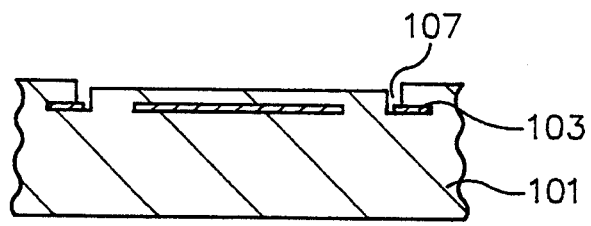

As shown in FIG. 12, a hole 107, for etching the buried silicon oxide layer 103, is formed by either RIE etching or by wet etching using potassium hydroxide.

Figure 13:
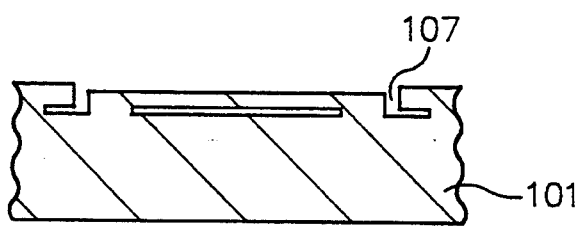

The surface of the buried silicon oxide layer 103 (see FIG. 12 before etching) is etched (i.e. removed) by using an aqueous hydrogen fluoride solution or a hydrogen fluoride gas, as shown in FIG. 13.

Figure 14:
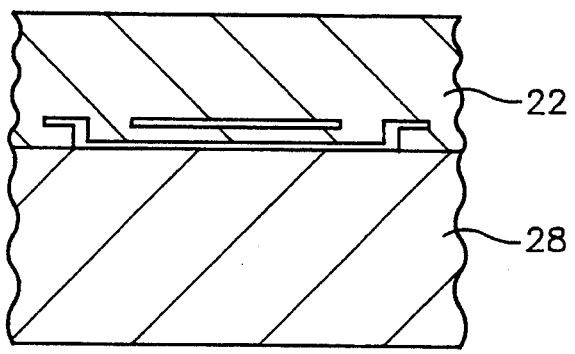

A silicon substrate 22 is anodically joined to a support substrate 28 made, for example, of PYREX (a proprietary heat resistant glass) glass. The resulting structure is shown in FIG. 14.

The structure obtained by such illustrative method of the invention achieves the follow advantages, for example. (1) The apparatus is produced free of any special pressure resistant container, because the exterior of the differential pressure sensor is exposed to atmospheric pressure. (2) The apparatus requires no high pressure resistant, hermetically sealed terminals for outputting an electrical signal. (3) The fabrication process is simplified because the silicon wafer is machined on only one side. (4) The apparatus does not require any separate protective mechanism to protect against overpressure since the sensor itself has such a mechanism. (5) The differential pressure measuring apparatus is substantially noise free since the propagation of an external disturbing strain directed at the diaphragm is effectively avoided by first chamber 21, chamber 29, and second chamber 26 surrounding diaphragm 23.

Figure 15:
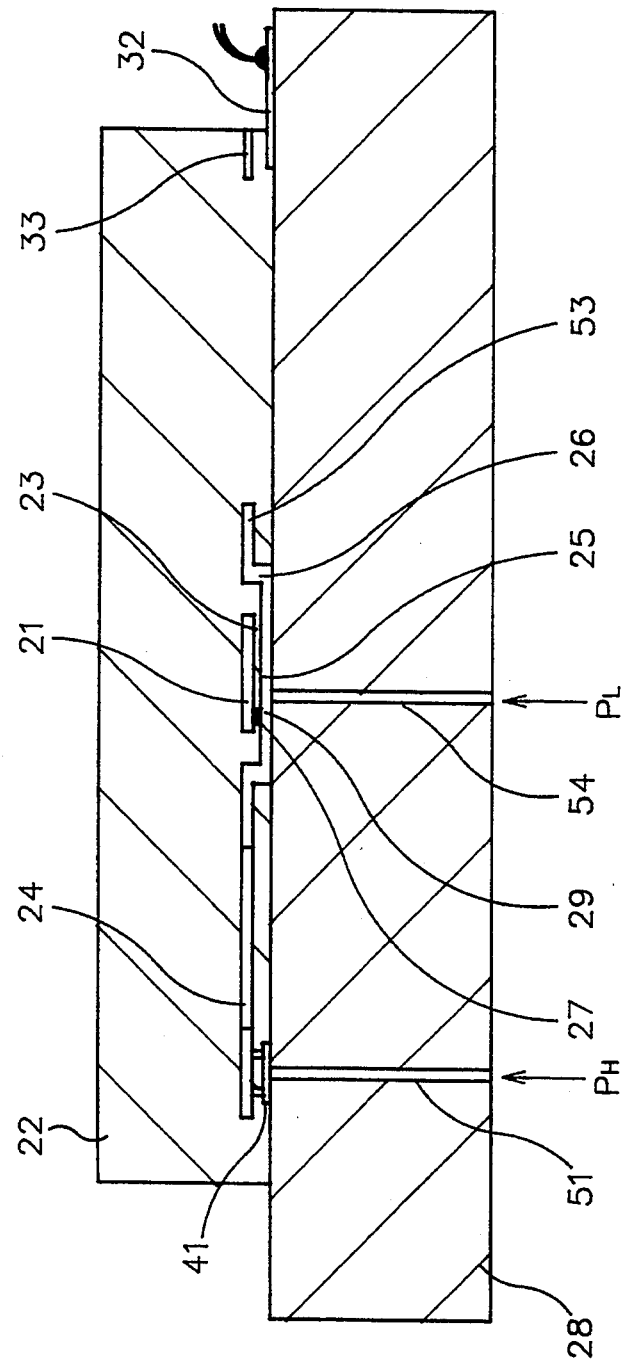
FIG. 15 is a diagram depicting another illustrative embodiment of the invention.

Referring to FIG. 15, the second illustrative embodiment is characterized by a third connection hole 54 provided in support substrate 28 for introducing pressure and for communicating directly to a chamber 29. The support substrate 28 may be made of silicon or polysilicon (i.e. polycrystallline silicon) instead of PYREX. Although in the FIG. 2 embodiment, an SOI substrate was used, other fabrication techniques and materials can be used, such as, for example, a silicon substrate having a patterned silicon oxide film thereon and polysilicon grown further thereon, can be used in the fabrication process.

Figure 16:
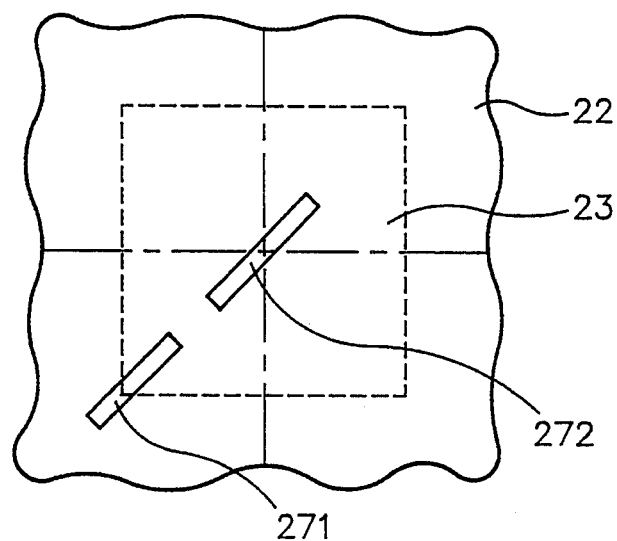
FIG. 16 is a detailed diagram depicting a portion of FIG. 15.

In the embodiment of FIG. 15, strain detector elements 271 and 272 (see FIG. 16) are arranged generally on the side of diaphragm 23 in such a manner that maximum sensitivity is achieved. One element is placed at the center and the other element is placed on the edge of diaphragm 23 so that the two elements may undergo reverse phase operation.

The differential measurement apparatus shown in FIG. 15 receives overpressure directly using diaphragm 23. Accordingly, diaphragm 23 displaces and, if diaphragm 23 surpasses a predetermined spacing, immediately moves to and is stopped by the wall of first chamber 21, or chamber 29, both chambers functioning as a measuring chamber. It can thus be seen that the strain, which is generated on strain detector elements 271 and 272, undergoes a non-linear change.

Figure 17:
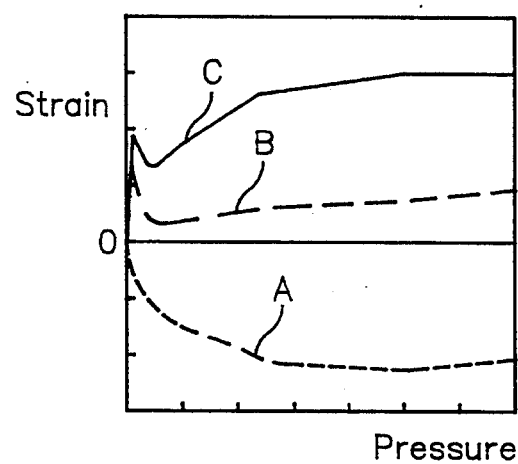
FIG. 17 is a graph depicting an operation of the embodiment of FIG. 15.

The relationship between the strain detected by elements 271 and 272 and the applied pressure is shown in FIG. 17, wherein curves A and B are strain curves obtained by elements 271 and 272, respectively; and curve C corresponds to the difference between the strain obtained by elements 271 and 272.

Figure 18:
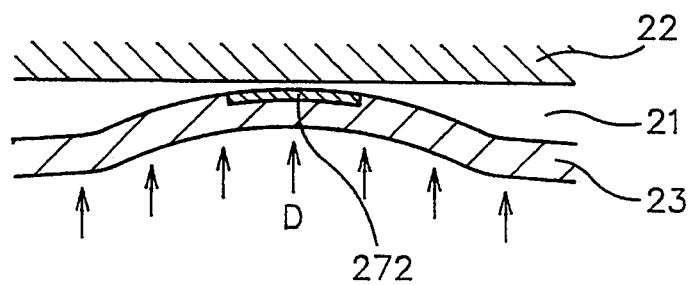
FIG. 18 is a diagram depicting an operation of the embodiment of FIG. 15.

The process of detecting overpressure using elements 271 and 272 is as follows:

(1) Referring to strain detector element 272 disposed at the center of diaphragm 23 as shown in FIG. 18, a tensile strain is detected when an overpressure is applied from the direction shown by arrow D until diaphragm 23 touches the wall of the first chamber 21.

Figure 19:
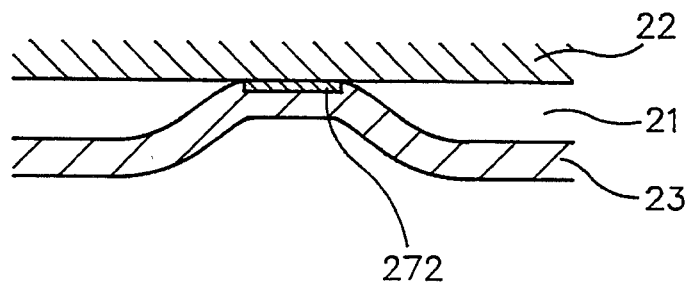
FIG. 19 is a diagram depicting another operation of the embodiment of FIG. 15.
Figure 20:
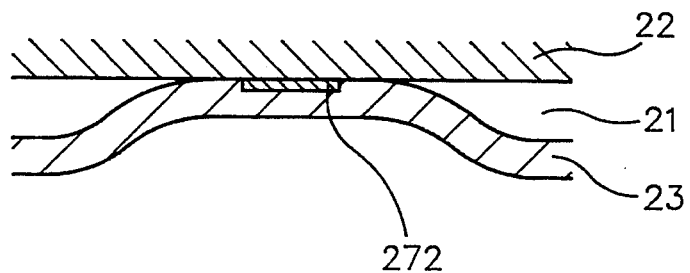
FIG. 20 is a diagram depicting a further operation of the embodiment of FIG. 15.
Figure 21:
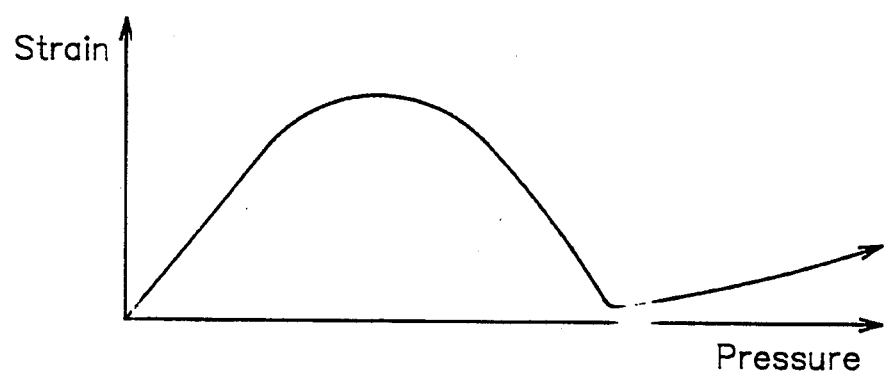
FIG. 21 is a graph depicting an operation of the embodiment of FIG. 15.

It can be seen from FIG. 19 that compression strain is detected instead of tensile strain once diaphragm 23 is brought into contact with the wall of first chamber 21. In the subsequent process of extending diaphragm 23 against the wall of first chamber 21, which diaphragm 23 is backed up thereagainst, as shown in FIG. 20, the strain again turns into a tensile strain. Consequently, the strain detector element 272, on applying overpressure, changes from an increase to a decrease, and then to an increase again. This change in detected strain is shown in FIG. 21.

Figure 22:
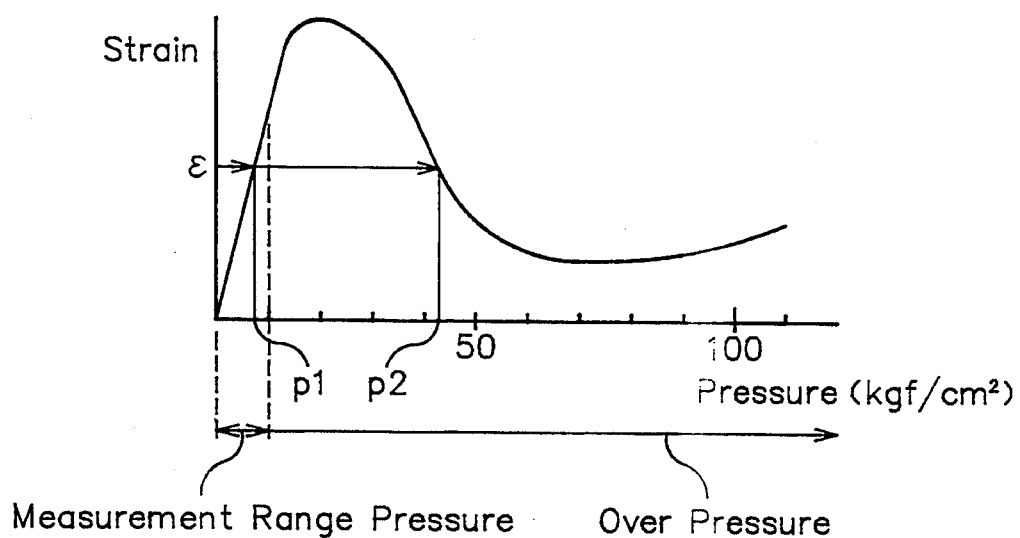
FIG. 22 is a graph depicting another operation of the embodiment of FIG. 15.

It can be seen from the foregoing description that there is no one-to-one correspondence between the applied pressure and the strain detected by element 272 alone. It follows that, as can be seen from FIG. 22, the detected strain $\epsilon$ cannot be definitely designated an overpressure, since the strain as read may be identified as either a pressure P1, within the allowable measurement range, or a pressure P2, belonging to the overpressure range.

(2) The strain detected by element 271, which is disposed on the edge of diaphragm 23, increases uniformly with increased applied pressure (as shown in FIG. 17). This signifies that the relationship between the applied pressure and the strain is a one-to-one correspondence and that the over-pressure can be judged from the detected strain.

Figure 23:
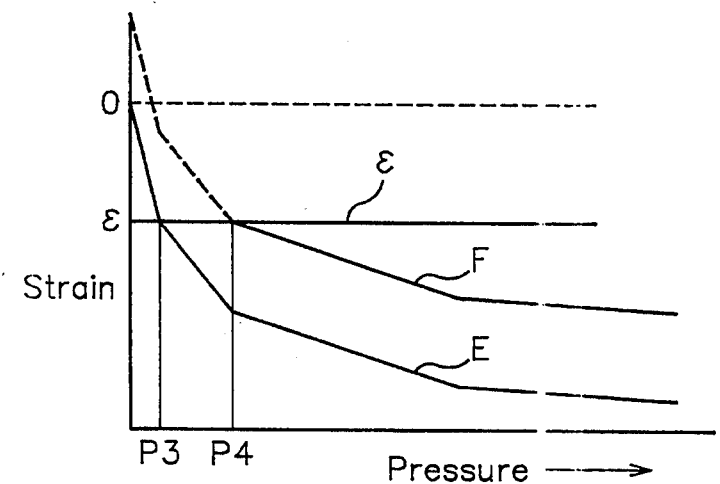
FIG. 23 is a graph depicting a further operation of the embodiment of FIG. 15.

Considering the practical usage of the element 271, it can be seen that element 271 is subject to various changes in conditions with respect to, for example, static pressure and temperature. When a static pressure is applied in addition to differential pressure, for example, the strain detected by element 271 includes an additional offset. Accordingly, the true characteristic curve for the strain indicated by curve E in FIG. 23 is displaced to give curve F as shown in FIG. 23. If the initial strain caused by overpressure is determined to be ε, the actual overpressure will slip from P3 to P4, thus making detection thereof difficult, if not impossible.

(3) Then, to cancel out the influence attributed to static pressure, temperature, etc., the difference between the output signals from elements 271 and 272 may be calculated and used for determining overpressure.

This method, however, may not be entirely feasible because the differential signal obtained from the elements 271 and 272 again has no one-to-one correspondence with the applied pressure. This can be seen clearly in FIG. 24. The reason for the lack of one-to-one correspondence in the relationship between the applied pressure and the detected differential strain signal, shown in the graph of FIG. 24 as the unnumbered curve, is believed to be as follows. Strain detecting element 271 recovers so fast from the deformed state under compression that even when the differential signal is detected between the elements 271 and 272, no output can be obtained as a uniformly decreasing or increasing signal under such condition of overpressure.

Figure 25:
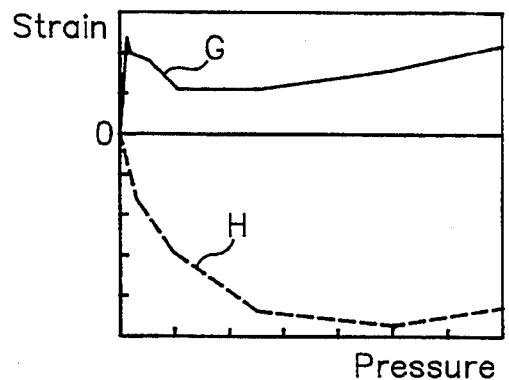
FIG. 25 is a graph depicting a still further operation of the embodiment of FIG. 15.

FIG. 25 shows the relationship between the applied overpressure and the strain detected by element 272 (see curve G) and that between the applied pressure and the strain detected by the strain detecting element 271 (see curve H).

It can thus be seen from the foregoing description that detection of overpressure with a desired degree of precision leaves something to be desired when considering the aforementioned three methods. One solution to this situation is to provide a detector element for detecting overpressure which is in addition to the detecting elements 271 and 272. However, such added detector requires additional circuitry, which itself will increase manufacturing costs and increased steps of manufacture.

Figure 26:
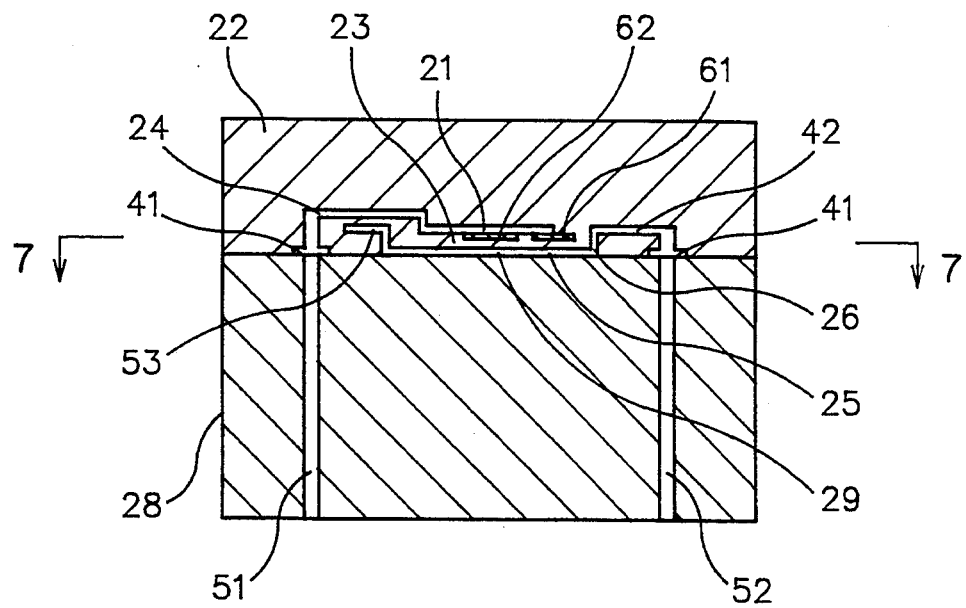
FIG. 26 is a diagram depicting a further illustrative embodiment of the invention.
Figure 27:
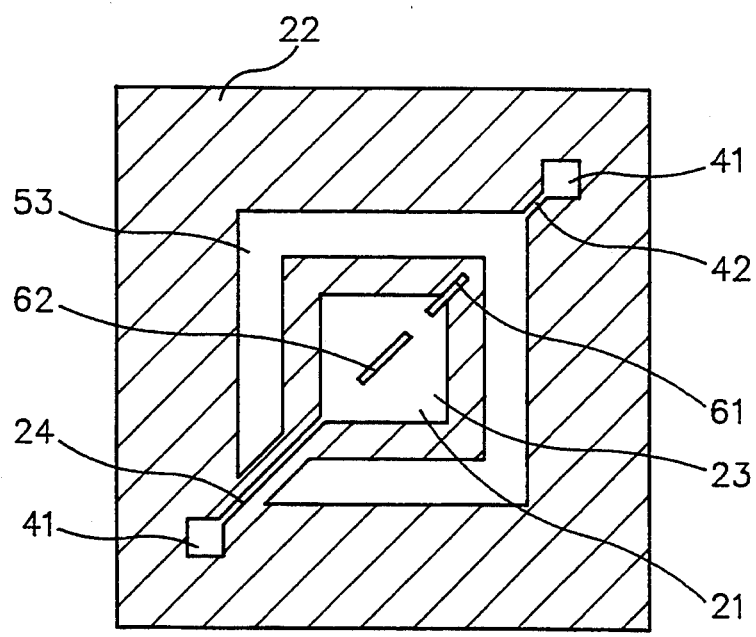
FIG. 27 is a cross sectional view taken along line C—C of FIG. 26.
Figure 28:
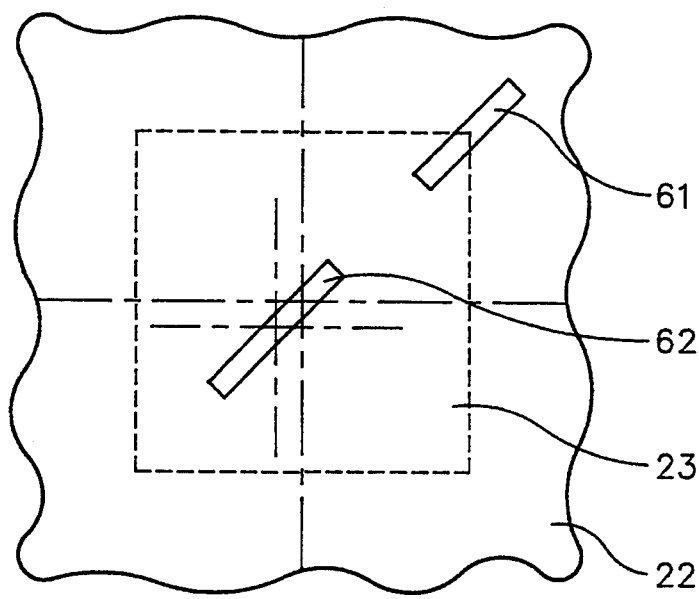
FIG. 28 is a detailed diagram depicting a portion of FIG. 27.

FIG. 26 depicts another illustrative embodiment of the invention which aims to further improve the pressure measuring art. FIGS. 26 and 27 depict portions having the same functions as those shown in FIG. 2 and such portions bear the same symbols. Only portions differing therefrom are discussed hereinbelow.

A first strain detector element 61 is disposed at the edge portion of measuring diaphragm 23. A second strain detector element 62 is disposed at a position slightly offset from the center of diaphragm 23 in such a manner that the difference between the output signal therefrom and the output signal from first strain detector element 61 may change as a single value function (i.e. the differential signal is in a one-to-one correspondence with the applied pressure).

Figure 29:
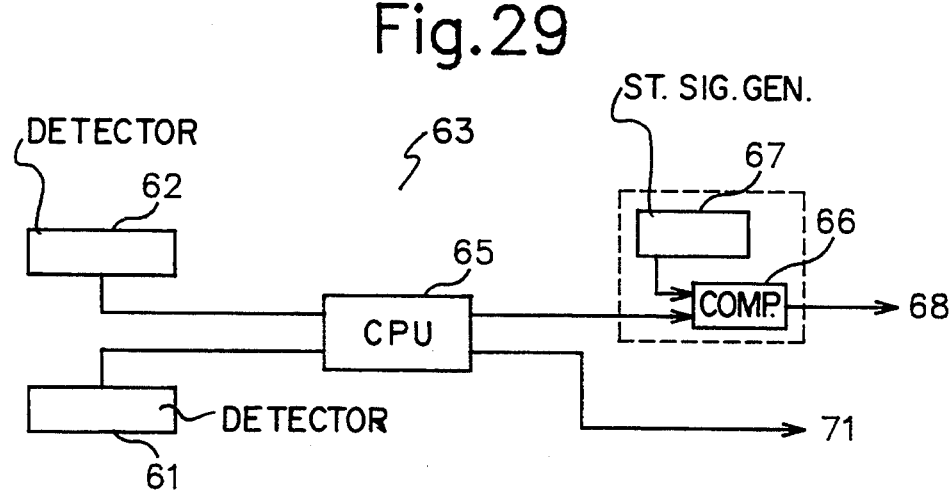
FIG. 29 is a diagram depicting a means for judging overpressure in the embodiment of FIG. 26.

FIG. 29 shows a device 63 for detecting overpressure which detects the differential signal between the signals from first element 61 and second element 62, to determine whether an overpressure is applied or not. For example, the means 65 for detecting overpressure may comprise a central processing unit (CPU) 65 to perform differential calculations on the signals from element 61 and element 62. The calculated signal from CPU 65 is applied to comparator 66, which compares the calculated signal with a standard signal 67 and outputs an overpressure determining signal 68. A detection signal 71 for the differential of measured pressure, is also outputted from the results obtained through calculation by CPU 65.

In the foregoing embodiment, a measuring pressure of the high pressure side and a measuring pressure of the low pressure side are applied, respectively, to measuring chambers 21 and 29, provided on both sides of measuring diaphragm 23. Then, as a result, silicon diaphragm 23 is deformed in correspondence to the pressure difference between the applied higher and lower pressures. The strain resulting from the deformation of diaphragm 23 is electrically detected by elements 61 and 62, and the signal corresponding to the strain is outputted to the exterior via a lead 31 and a contact 32 (as in the embodiments of FIGS. 2 and 15) to give the differential pressure.

When an overpressure is applied to diaphragm 23, the wall of either of measuring chambers 21 and 29 stops the movement of diaphragm 23 which moves thereagainst.

Figure 30:
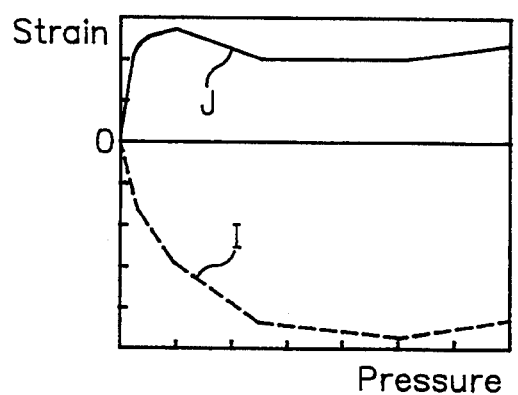
FIG. 30 is a graph depicting an operation of the embodiment of FIG. 26.
Figure 31:
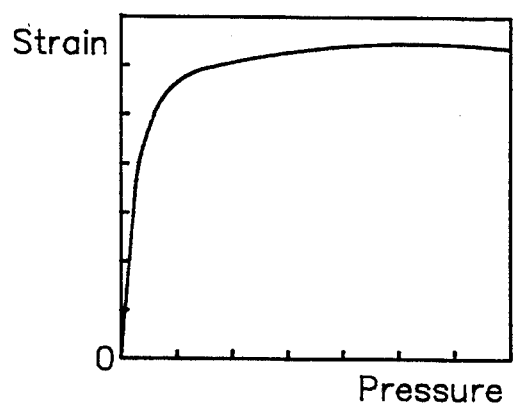
FIG. 31 is a graph depicting another operation of the embodiment of FIG. 26.

FIG. 30 shows the relation between the applied overpressure and the strain detected by element 61 (see curve I) and that between the applied pressure and the strain detected by element 62 (see curve J). FIG. 31 shows the relation between the overpressure and strain of the difference between the strains detected by elements 61 and 62.

Figure 24:
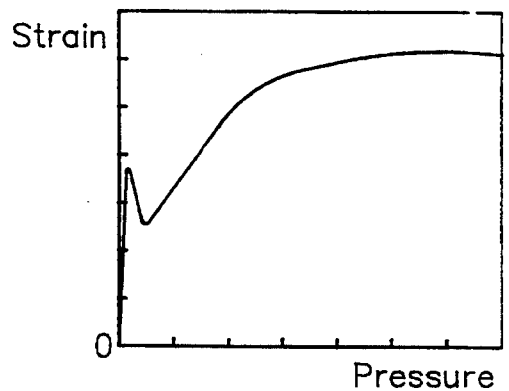
FIG. 24 is a graph depicting another operation of the embodiment of FIG. 15.

When a strain detecting element 272 is disposed at the center of diaphragm 23, the signal for the difference in strain yields a characteristic curve which exhibits an abrupt decrease from the point where diaphragm 23 contacts the wall of chambers 21 and 29. Reference is made to FIG. 24 which shows such characteristic curve. In contrast to the characteristic behavior of a conventional apparatus, the embodiment of FIG. 26 yields a uniformly increasing curve, as shown in FIG. 31, for the difference between the detected strains. Since the strain can be expressed as a single valued function of the applied pressure (i.e., the difference between the detected strains is in a one-to-one correspondence to the applied pressure), whether an overpressure is applied or not can be easily determined.

The advantage accrued by the FIG. 26 embodiment is believed to be attributable to the fact that decrease in the detected strain for element 62 is somewhat relaxed as compared to the abrupt recovery of strain in, for example, detector element 272 of the other embodiments. More specifically, it is believed that the strain recovery occurs only in a part of the fixed portions of the detector element 62 and such recovery does not take place at any other fixed portions.

It can be seen from the foregoing description that the difference between the detected strains from detector elements 61 and 62 does not yield a decrease in the characteristic strain curve with respect to the applied pressure, and that thereby such difference can be used to detect overpressure.

To summarize, this embodiment comprises a semiconductor type differential pressure measurement apparatus which is capable of detecting overpressure with high reliability, wherein a measuring diaphragm 23 is provided which can be readily moved up to and stopped by the walls of chambers 21 and 29, and wherein one of the strain detecting elements (e.g. element 62) is disposed to be slightly offset from the center of diaphragm 23, and wherein the difference is calculated between the strain detected by element 62 and element 61. Furthermore, advantageously, the invention can be manufactured without using a separate strain detecting element to detect overpressure. Accordingly, a simple, reliable, and economical apparatus is readily manufactured according to the invention. Also, as discussed, one of the detector elements is disposed to be slightly offset from the center of the diaphragm such as done in the prior art. Accordingly, with a simple change in the fabrication steps, one can utilize the knowledge acquired in practicing the prior art, to produce the just described embodiment. Thus, in the fabrication of the apparatus, less expert workers can be employed and production line down time can be minimized, both of which conditions are hightly sought in any manufacturing scheme.

Referring to the apparatus of FIG. 2, the precision of finishing diaphragm 23 to a desired thickness depends on the polishing step as shown in FIG. 10. Polishing methods, in general, yield a precision of about ±5 μm for a finished thickness of 500 μm, and a higher precision cannot be achieved. The thickness of the diaphragm used in the apparatus is about 20 μm. However, a dimensional precision of ±5 μm is rather large and may impair the product yield. A poor yield will raise the manufacturing cost.

FIGS. 32 to 41 depict an illustrative method of the invention which overcomes the above discussed polishing problem. More specifically, a novel method of manufacturing the apparatus depicted for example in FIG. 2, is now explained hereinbelow. The invention method produces an apparatus having a diaphragm whose thickness dimension which is controlled with high precision, and is economical.

Figure 32:
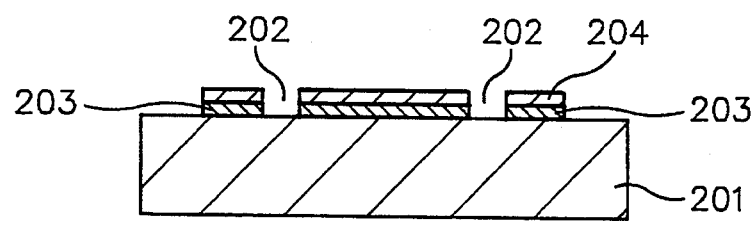
FIGS. 32-41 are diagrams depicting the steps in the illustrative method of the invention for manufacturing the invention, wherein polishing is greatly improved.

Referring to FIG. 32, an SOI wafer having a silicon oxide layer 203 and a silicon layer 204 is subjected to RIE etching, to remove predetermined portions 202. In this case, for example, silicon substrate 204 is about 600 μm in thickness, and comprises thereon silicon oxide layer 203 which is about 1 μm thick, and silicon layer 204 which is about 0.5 μm thick.

Figure 33:
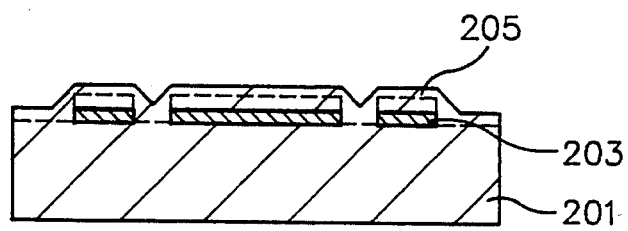

An epitaxially grown layer 205 is then grown to a thickness of about 20 μm on the surface of the SOI wafer 201. The resulting structure is shown in FIG. 33. The thickness of diaphragm 23 depends on the thickness of layer 205.

Figure 34:
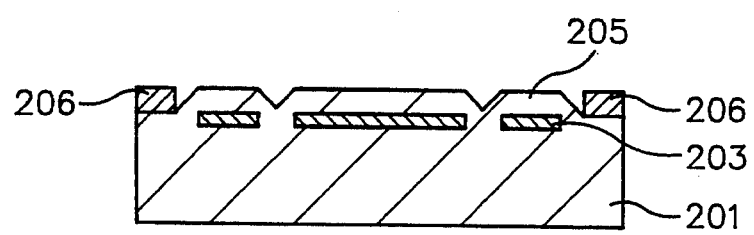

A silicon oxide film 206 is then patterned on the peripheral surface of layer 205. The resulting structure is shown in FIG. 34. The thus patterned silicon oxide film 206 functions as a stopper in the selective polishing step.

Figure 35:
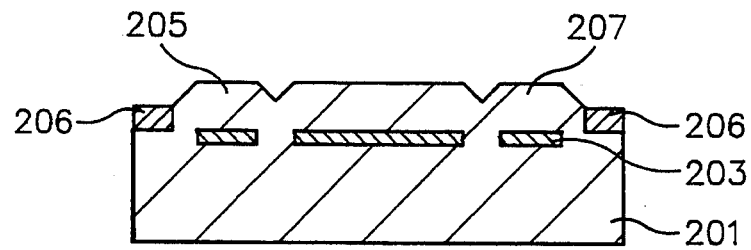

Referring to FIG. 35, an epitaxially gown layer 207 is grown to a predetermined thickness on the surface of the previously obtained epitaxially grown layer 205. The epitaxially grown layer 207 may be grown, for example, to a thickness of about 5 μm.

Figure 36:
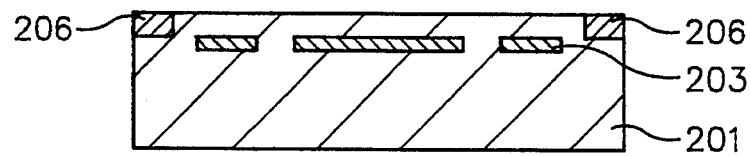

Referring to FIG. 36, the resulting structure is subjected to selective polishing using the silicon oxide film 206 as a stopper. This step is conducted by using a mechanical polishing arrangement and a polishing solution comprising a weakly alkaline solution having suspended therein colloidal silica (i.e. a fine powder of silicon oxide). Because of the ratio of the polishing rate of silicon to that of silicon oxide amounts to about 100, polishing does not advance beyond the silicon oxide film 206.

Figure 37:
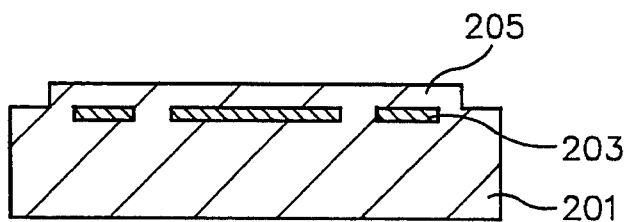

Then, the silicon oxide film 206 is removed by etching, to produce the structure shown in FIG. 37.

Figure 38:
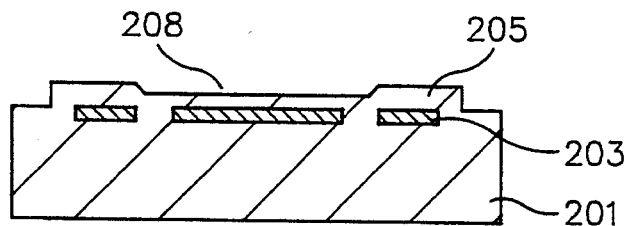

A concave portion 208 is etched on layer 205 by an RIE etching method, to produce the structure shown in FIG. 38.

Figure 39:
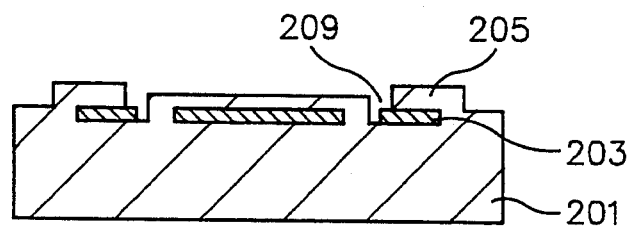

Going now to FIG. 39, a hole 209, for use in etching silicon oxide layer 203 in the SOI wafer, is perforated in layer 205 by etching, using either the RIE etching method, or using an alkaline solution, such as potassium hydroxide.

Figure 40:
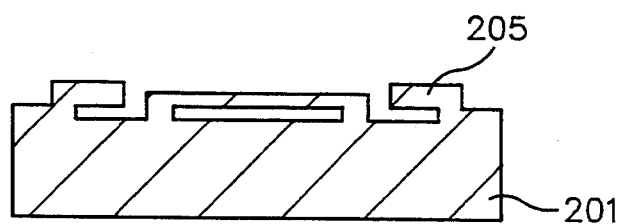

Referring to FIG. 40, the silicon oxide layer 203 is etched by using either an aqueous hydrogen fluoride solution or a hydrogen fluoride gas.

Figure 41:
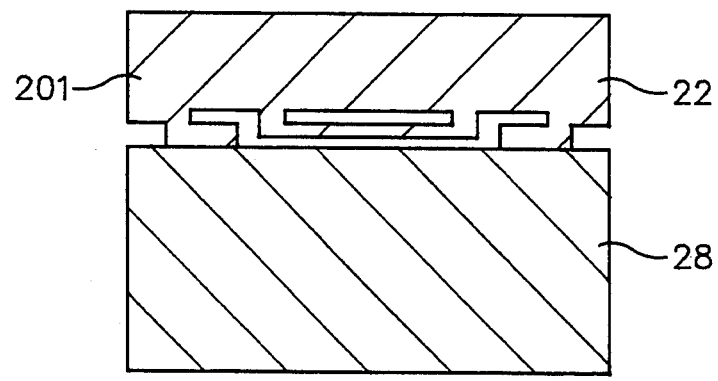

A silicon substrate 22 is anodically joined with a support substrate 28 made, for example, of Pyrex glass, to obtain the structure shown in FIG. 41.

The thus produced structure advantageously comprises a diaphragm 23 which has a precisely controlled thickness. As discussed, this was obtained by patterning a silicon oxide film 206 on the surface of the periphery of the epitaxially grown layer 205 and by conducting selective polishing using the silicon oxide film 206 as a stopper. Advantageously, this invention method results in greatly reduced manufacturing costs. Also, as discussed, advantageously, the diaphragm obtained by the invention method has a thickness of 20 μm with a tolerance of as high as ±0.5 μm.

The SOI substrated used in the above embodiments may be replaced by a silicon substrated obtained by forming thereon a patterned silicon oxide film, and further having formed thereon a polysilicon layer.

Referring again to the embodiment of FIG. 2, a sacrificial layer etching method may be used to produce the first chamber 21 between the diaphragm 23 and the silicon substrate 22. The technique of sacrificial layer etching refers to a method wherein first a sacrificial layer is provided between a substrate and a structural layer (i.e. a layer which functions as a constituent of a structure), and finally the sacrificial layer alone is removed by selective etching to provide an opening between the structure and the substrate. For details of such process, see for example, "Novel Freeze and Dry Process for Sacrificial Layer Etching Process", Proc. Annual Meeting of Electrical Society of Japan, 1992, Vol. 4, No. 397.

Using a conventional process to fabricate the FIG. 2 embodiment may produce the following problems. On drying the diaphragm 23 after rinsing, the diaphragm 23 tends to be absorbed into the silicon substrate 22 by the surface tension of the rinsing solution, and it may happen that the diaphragm cannot be easily separated from the silicon oxide substrate 22.

To solve this problem, a freeze and dry process, which comprises freezing the rinsing solution before drying and sublimating the frozen rinsing solution, has been proposed. However, such a proposed method requires the control of the temperature of the wafer to prevent the dissolution of the rinsing solution during the sublimation. It is necessary to prevent dewing from occurring during the time the wafer is being take out into the open air upon completion of the sublimation step. Accordingly, such proposed method would be difficult to precisely repeat more than once, and furthermore, would require complex process steps.

Also, the surfaces of diaphragm 23 and silicon substrate 22 may be rendered adhesive after the silicon oxide layer 203 is etched, because hydroxyl ion (OH$^-$) groups remain attached to the dangling bonds of the surface silicon atoms. Since those OH$^-$ groups readily combine with each other to generate $H_2O$, the silicon atoms are thereby combined with oxygen atoms.

FIGS. 42–49 depict another illustrative embodiment of the invention which overcomes the above described and other problems. More specifically, there is described a method of manufacturing a semiconductor type differential pressure measurement apparatus which eliminates the problem of adhesion of diaphragm 23 and silicon substate 22.

Figure 42:
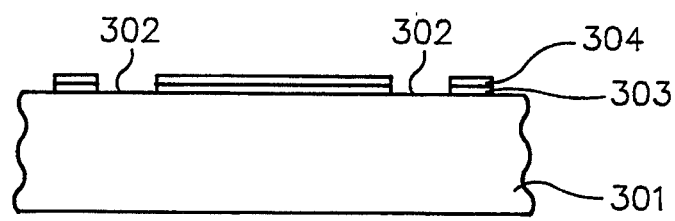
FIGS. 42-49 are diagrams depicting another illustrative method of the invention.
Figure 43:
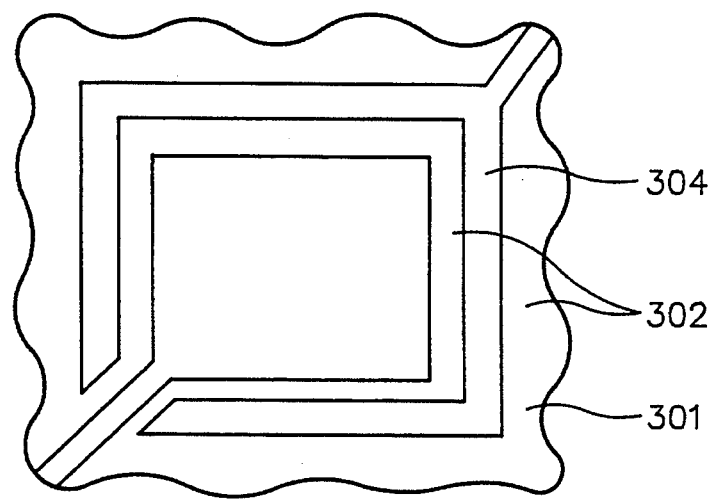

Referring to FIG. 42, an SOI wafer having a silicon oxide layer 303 and then a silicon layer 304, is subjected to RIE etching, to remove the predetermined portions 302. FIG. 43 shows a plan view of the structure of FIG. 42.

Figure 44:
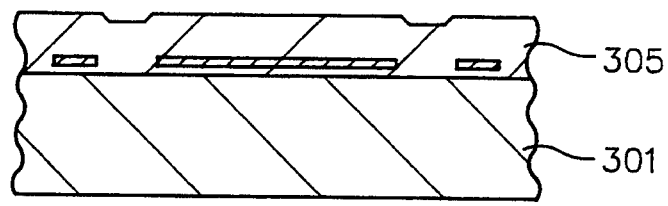

An epitaxially grown layer 305 is then grown on the surface of wafer 301. The resulting structure is shown in FIG. 44.

Figure 45:
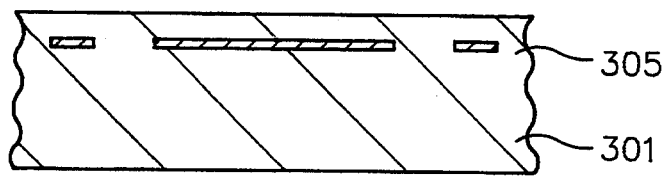

Going to FIG. 45, the surface of the layer 305 is subjected to polishing, to produce a mirror surface.

Figure 46:
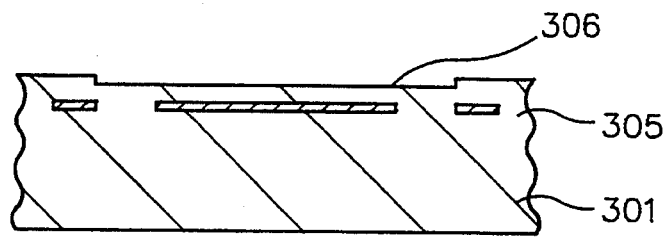

The thusly obtained layer 305 is then subjected to RIE etching to produce a concave portion 306. The resulting structure is shown in FIG. 46.

Figure 47:
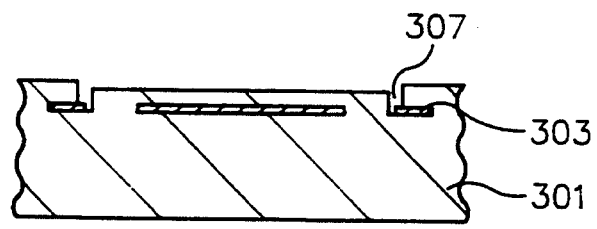

Referring to FIG. 47, a hole 307, for use in etching the buried silicon oxide layer 303 in the SOI wafer, is perforated in the epitaxially grown layer 306, by an etching method, using either the RIE etching method, or by using an alkaline solution, such as potassium hydroxide.

Figure 48:
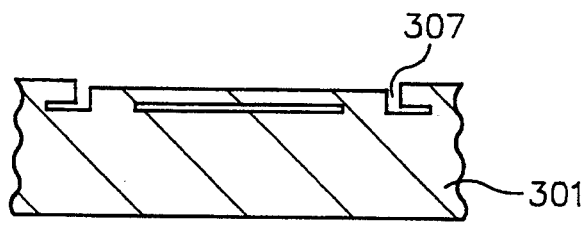

Referring to FIG. 48, the structure is subjected to vapor phase etching in a mixed gas comprising hydrogen fluoride gas and a trace amount of water vapor, using the silicon oxide layer 303 as the sacrificial layer. The vapor phase etching of the sacrificial layer may be conducted, for example, in a mixed gas containing 95% nitrogen gas, 4.99% hydrogen fluoride gas, and 0.01% water vapor. However, it should be understood that the mixing ratio of the gas components is given only as an example, and other gas mixtures may be used so long as the vapor phase etching can be conducted therein.

Figure 49:
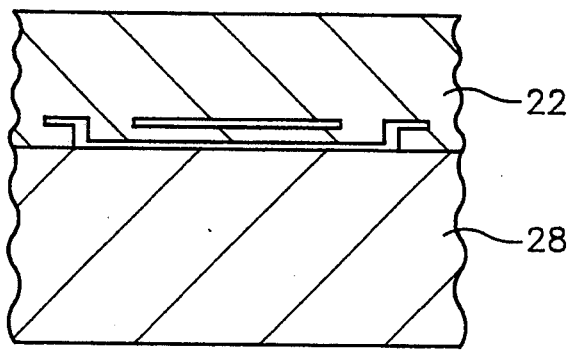

A silicon substrate 22 is anodically joined with a support substrate 28 made of Pyrex glass, to obtain the structure shown in FIG. 49.

An etching apparatus of the invention is shown in FIG. 50, wherein the apparatus comprises a chamber K, a sample support L with a wafer M to be etched being mounted thereon.

The vapor phase etching practiced with this apparatus proceeds according to the reaction scheme expressed as follows:

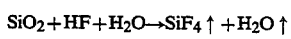

$$SiO_2 + HF + H_2O \rightarrow SiF_4 \uparrow + H_2O \uparrow$$

Nitrogen (N$_2$) gas is circulated in a sufficient amount to drive out gaseous silicon fluoride (SiF$_4$) and water (H$_2$O) from the system and thereby prevent liquification from occurring.

In this manner, diaphragm 23 and silicon substrate 22 are prevented from adhering to each other by the surface tension of the remaining liquid.

Figure 52:
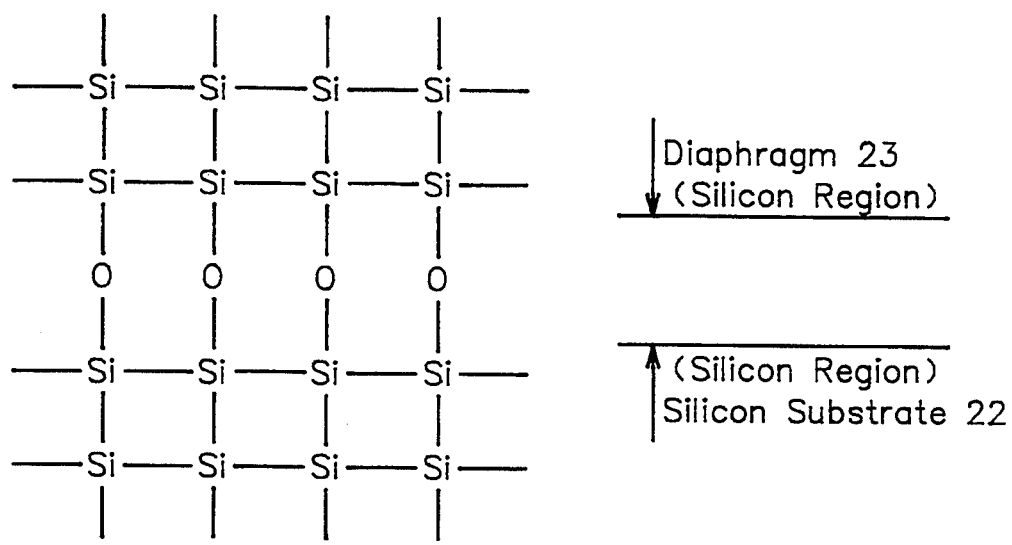
FIG. 52 is a diagram depicting an operation of another illustrative embodiment of the invention.
Figure 53:
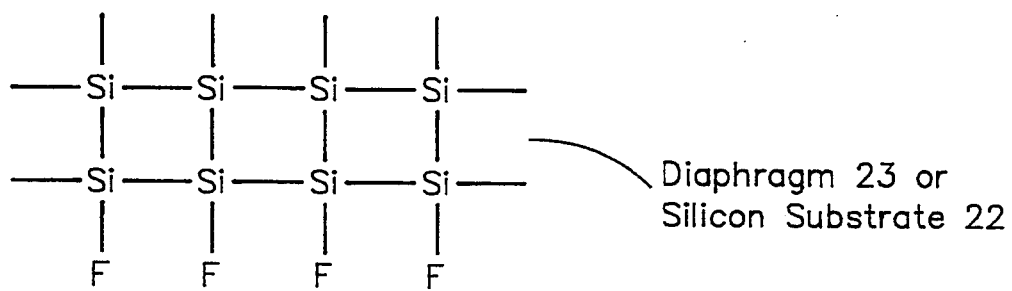
FIG. 53 is a diagram depicting an operation of a further illustrative embodiment of the invention.

A wet etching process produces silicon surfaces as shown in FIG. 51 upon etching of silicon oxide (SiO$_2$). It can be readily understood that diaphragm 23 and silicon substrate 22 readily combine with each other through a tight chemical bonding, as shown in FIG. 52. In the invention method, which is contrasted with the wet etching process, the surface of silicon is terminated with fluorine atoms to give an extremely inactive surface even resistant to heat treatment at 900° C. For details, see, for example, "Cleaning Using Anhydrous HF gas-5.Evaluation of Surface Cleaned Using HF gas" which appears in Oyo Butsuri (Applied Physics), Vol. 59, No. 11, 1900, Page 1508.

It can be seen from the foregoing that the etching of silicon oxide sacrificial layer 303 using vapor phase etching avoids adhesion of the various parts in the etching step, and provides an inert surface after etching. Accordingly, this process is extremely effective in preventing adhesion.

As described, the etching of the silicon oxide using a vapor phase etching process with hydrogen fluoride gas prevents adhesion of the surfaces of various members otherwise resulting from the surface tension of the etching solution, and furthermore, terminates the surface silicon atoms generated by etching with fluorine atoms thereby to render the surface non-adhesive.

According to the manufacturing method of the invention and shown, for example, in FIGS. 42–49, an apparatus is produced which is free of any adhesion between diaphragm 23 and substrate 22.

The foregoing description is illustrative of the principles of the invention. Numerous extensions and modifications thereof would be apparent to the worker skilled in the art. All such extensions and modifications are to be construed to be within the spirit and scope of the invention.

What is claimed is:

1. A semiconductor type differential pressure measurement apparatus comprising
   a first chamber defined by a predetermined space provided between a silicon substrate and a diaphragm formed on said silicon substrate;
   a first communicating hole provided on said silicon substrate, one end thereof communicating with said first chamber;
   a concave portion provided on said diaphragm on a side thereof opposite that on which said first chamber is provided;
   a second chamber provided on said silicon substrate with an overhang, said second chamber communicating with said concave portion and mounted in a ring-like manner around said diaphragm except at said first communicating hole;
   a second communicating hole provided on said silicon substrate, one end thereof communicating with said overhang;
   a strain detector element provided on said diaphragm on a side thereof on which said concave portion is provided; and
   a support substrate having one surface thereof joined with a surface of said silicon substrate having said concave portion provided thereon, said support substrate together with said concave portion defining said second chamber.

2. The apparatus of claim 1, wherein said support substrate comprises heat resistant glass.

3. The apparatus of claim 1, wherein said support substrate comprises silicon.

4. The apparatus of claim 1, wherein said support substrate comprises polysilicon.

5. The apparatus of claim 1, further comprising
   a connection comprising a conductor and formed by introducing impurities into said one surface of said support substrate whereat is joined said silicon substrate and said support substrate, said connection being connected to said strain detector element at one end thereof;
   a contact provided on a surface of said silicon substrate and connected to said connection at one end thereof; and
   a groove formed on said silicon substrate in the vicinity of said contact, said groove absorbing undesired force generated at the contact portion between said silicon substrate and said contact.

6. The apparatus of claim 1, further comprising
a filter provided at an end of each of said first and second communicating holes, said filter having a depth dimension of d, said dimension d being sufficiently small so as to satisfy the relation $d \leq (A-B)$, wherein A represents the depth spacing of said first chamber and B represents the displacement of said diaphragm.

7. A semiconductor type differential pressure measurement apparatus comprising a first chamber defined by a predetermined space provided between a silicon substrate and a diaphragm formed on said silicon substrate;

a first communicating hole provided on said silicon substrate, one end thereof communicating with said first chamber;

a concave portion provided on said diaphragm on a side thereof opposite that on which said first chamber is provided;

a second chamber provided on said silicon substrate with an overhang, said second chamber communicating with said concave portion and mounted in a ring-like manner around said diaphragm except at said first communicating hole;

a second communicating hole provided on said silicon substrate, one end thereof communicating with said overhang;

a support substrate having one surface thereof joined with a surface of said silicon substrate having said concave portion provided thereon, said support substrate together with said concave portion defining said second chamber;

a first strain detector means located on an edge portion of said diaphragm on a side thereof on which said concave portion is provided;

a second strain detector element located on said diaphragm on a side thereof on which said concave portion is provided and at a position slightly offset from a center of said diaphragm, said second strain detector element being located in such a manner that said second strain detector element outputs, at least within an allowable range of measurement, a reverse phase signal with respect to the output signal of said first strain detector element, providing a differential signal of output signals from said first and second strain detector elements which behaves as a single valued function of applied pressure; and means for detecting a signal which determines whether or not an overpressure is applied by detecting the differential of the output signals from said first and second strain detector elements.

* * * * *